United States Patent Office 3,013,079
Patented Dec. 12, 1961

3,013,079
RING HALOGENATION OF AROMATIC
CARBONYL COMPOUNDS
Donald E. Pearson, 2404 Barton Ave., and Hughlan W.
Pope, 1812 E. Belmont Circle, both of Nashville, Tenn.
No Drawing. Filed Jan. 18, 1957, Ser. No. 634,835
24 Claims. (Cl. 260—592)

This invention relates to a method for effecting the ring halogenation of aromatic carbonyl compounds and to certain novel ring halogenated aromatic carbonyl compounds. By the term "aromatic carbonyl compound," as used herein, is meant an aromatic ketone or an aromatic aldehyde having the formula,

wherein Ar represents an aryl radical free from nitrogen-containing substituents which can be (a) an unsubstituted aryl radical such as phenyl, naphthyl, anthryl, penanthryl, etc., or (b) an aryl radical having other aryl substituents which can be xenyl, phenylxenyl, etc., or (c) an aryl radical having alkyl substituents which can be methyl, ethyl, n-propyl, iso-propyl, n-butyl, iso-butyl, sec.-butyl, tert.-butyl, or other higher homologous and isomeric alkyl groups such as n-octyl, tert.-octyl, 2-ethylhexyl, n-decyl, iso-decyl, n-dodecyl, 2-butyloctyl, cetyl, cyclopropyl, cyclopentyl, cyclohexyl, etc., or (d) an aryl radical having other aliphatic substituents which can be methoxy, ethoxy, butoxy, methoxyethyl, butoxyethyl, methylthio, butylthio, etc., or (e) any aryl radical having other substituents free from nitrogen atoms such as halogen, hydroxy, carboxyl, etc. R in the above formula represents (a) hydrogen, or (b) an aryl radical which can be the same as or different from the aryl radical represented by Ar, or (c) an aliphatic radical which can be (i) an alkyl radical such as methyl, ethyl, n-propyl, iso-propyl, n-butyl, iso-butyl, sec.-butyl, tert.-butyl, or other higher homologous and isomeric alkyl groups such as n-octyl, tert.-octyl, 2-ethylhexyl, n-decyl, iso-decyl, n-dodecyl, 2-butyloctyl, cetyl, cyclopropyl, cyclopentyl, cyclohexyl, etc., or (ii) an alkylene radical which forms a part of a fused ring system as in 1-tetralone, or (iii) an alkenyl radical, however such groups containing ethylenic unsaturation may be subject to an addition reaction by the hydrogen halide which is generated as a by-product of the method of this invention or may be subject to a polymerization reaction, or (iv) other aliphatic radicals which can be methoxyethyl, ethoxyethyl, butoxyethyl, etc., or (d) heterocyclic radical which can be thenyl, thienyl, furyl, furfuryl, pyranyl, pyridyl, pyrryl, etc.

According to the method of this invention, a Lewis salt of an aromatic carbonyl compound, formed by complexing the aromatic carbonyl compound and a strong Lewis acid, is reacted with the halogenating species as formed from halogen molecules in the presence of a strong Lewis acid. This method effects halogen substitution on carbon atoms of the same aromatic ring to which the carbonyl group is attached, to the virtual exclusion of halogen substitution on any aliphatic group represented by R, or on any aliphatic group which is a substituent of the aryl group represented by Ar, in the formula set out above. Furthermore, when monohalogenation of an aromatic ring is effected by the practice of this method, the halogen substitution takes place substantially entirely on the ring carbon atom in the "3" or meta position with respect to the carbonyl group.

Prior art methods of halogenating an aromatic carbonyl compound have failed to effect halogen substitution on an aromatic ring, but rather have resulted only in halogen substitution on an aliphatic group. For example, in Organic Synthesis, Coll. vol. II, 480 (1944), there is described a procedure for the reaction of acetophenone with bromine in the presence of aluminum chloride as a catalyst. The aluminum chloride was present only in a "catalytic quantity," that is, about 0.01 mol of aluminum chloride per mol of acetophenone, and one mol proportion of molecular bromine was reacted with the acetophenone. The reaction product was reported to be essentially phenacyl bromide, i.e.,

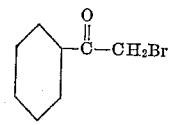

and apparently unaccompanied by any nuclear substitution products. In contrast, as will hereafter be shown in the examples, by the practice of this invention, when one mol proportion of acetophenone is first reacted with an excess over one mol proportion of aluminum chloride to form reaction mixture containing a Lewis salt of acetophenone and a quantity of unreacted aluminum chloride, and then one mol proportion of bromine is reacted with the Lewis salt of acetophenone, the principal reaction product is meta-bromoacetophenone, i.e.,

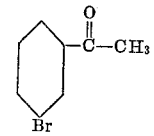

accompanied by very little or no phenacyl bromide. This invention, for the first time, provides a method for the direct ring halogenation of aromatic carbonyl compounds wherein the aryl group is unsubstituted or has one to four alkyl substituents.

To obtain ring halogenated aromatic carbonyl compounds according to the present invention, the aromatic carbonyl compound is first reacted with a strong Lewis acid to form a Lewis salt complex. As exemplary of the strong Lewis acids which are suitable to form the Lewis salt of the aromatic carbonyl compounds, are aluminum chloride, aluminum bromide, sulfuric acid, oleums, antimony pentachloride, boron trifluoride, boron trichloride, and halosulfonic acids, as well as mixtures of these materials. Of these strong Lewis acids, aluminum chloride and aluminum bromide are preferred for the practice of this invention. When sulfuric acid is employed as the strong Lewis acid, there is a greater amount of side chain halogenation. To form the Lewis salt, one chemical equivalent of a strong Lewis acid must be provided for each carbonyl group in the aromatic carbonyl compound; that is, where the aromatic carbonyl compound contains only one carbonyl group, the Lewis salt complex is formed by reacting one mol proportion of the aromatic carbonyl compound with one mol proportion of a strong Lewis acid. On the other hand, if the aromatic carbonyl compound should contain two carbonyl groups, both of which are attached to the same or different aryl groups, two mol proportions of a strong Lewis acid are provided for each mol proportion of the aromatic carbonyl compound to form the Lewis salt of the aromatic carbonyl compound.

After the Lewis salt of the aromatic carbonyl compound has been formed, this, in turn, is reacted with the halogenating species formed from halogen molecules in the presence of a strong Lewis acid. The halogen molecules can be molecular chlorine, bromine, or fluorine, or interhalogens such as bromine, monochloride, iodine monochloride, iodine monobromine, chlorine monofluoride, bromine fluoride, and iodine fluoride. The Lewis acid which is used with the halogen molecules to generate halogenating species can be the same or a different Lewis acid as was used to form the Lewis salt of the aromatic carbonyl compound. A very slight excess of strong Lewis acid over that required to form the Lewis salt of the aromatic carbonyl compound will effect generation of halogenating species. However, where the excess of Lewis acid is small, such as a 0.1 mol excess Lewis acid per mol of the Lewis salt of the aromatic carbonyl compound, the rate of nuclear substitution with halogen is comparatively slow, whereas nuclear substitution with halogen takes place at more rapid and commercially feasible rates where this excess of the Lewis acid is from about 0.5 to about 3 mols per mol of the Lewis salt of the aromatic carbonyl compound. Generally, an excess of from about 1 to 2 mols of the Lewis acid effects the generation of the halogenating species at an adequate and satisfactory rate.

Chlorine as a halogenating species can be generated by molecular chlorine or chlorine monofluoride in the presence of a strong Lewis acid; bromine as a halogenating species can be generated by molecular bromine, bromine monochloride, or bromine fluoride in the presence of a strong Lewis acid; fluorine as a halogenating species can be generated by molecular fluorine in the presence of a strong Lewis acid (this should be approached with extreme caution, as such a fluorination is extremely reactive); iodine as a halogenating species can be generated by iodine monochloride, iodine monobromide, or iodine fluoride in the presence of a strong Lewis acid. When interhalogens are employed, particularly those interhalogens containing iodine, mixtures of halogen-substituted carbonyl derivatives may be formed. The larger of the two halogen atoms generally predominates as the halogenating species, as indicated in the foregoing portion of this paragraph; however, the smaller halogen atom of the interhalogen also becomes a halogenating species, but usually to a lesser degree.

The temperature of the reaction mixture to effect the reaction between the halogenating species and the Lewis salt of the aromatic carbonyl compound needs to be only high enough so that the Lewis salt of the aromatic carbonyl compound is maintained in a liquid state and, generally, a temperature of the order of 25–40° C. is adequate. However, the reaction can be effected at higher temperatures up to the order of 185° C. A temperature within the range of about 30–85° C. is generally preferred.

The complexing of the aromatic carbonyl compound with a strong Lewis acid and the subsequent halogenation are carried out under dry conditions. By "dry conditions" is meant that there is no free or uncombined water in the reaction mixtures. An anhydrous reaction mixture is desirable but not necessary, as the reaction mixtures do not have to be maintained in an anhydrous state. In this respect, the term "anhydrous" is used to mean that there is no water present either in a combined or uncombined form. For example, when a Lewis salt of an aromatic carbonyl compound is prepared by using sulfuric acid as the Lewis acid, the sulfuric acid may be used in the form of 66° Bé. acid which contains about 93.2% sulfuric acid. Such a reaction mixture would be considered dry for the purposes of this invention, although not anhydrous. The reaction mixture would be considered to be dry because the small amount of water which is present is complexed with the sulfuric acid so that the water is not present in a free state.

The general procedure for practicing the method of this invention is two successive steps within a closed reaction vessel provided with appropriate means for introducing reactants and removing gaseous by-products. A sufficient quantity of the strong Lewis acid is first introduced into the reactor to provide the chemical equivalents to form the Lewis salt complex with the aromatic carbonyl compound plus the excess required to generate the halogenating species from the halogen molecules. The Lewis acid is then continuously stirred during incremental addition of the aromatic carbonyl compound to the Lewis acid. Where a solid Lewis acid, such as aluminum chloride, is employed, the initial increments of a liquid aromatic carbonyl compound result in a reaction mixture which is very difficult to stir or mix, however, additional increments of the aromatic carbonyl compound cause the reaction mixture to become mixable. It is important that thorough and intimate mixing of the Lewis acid with the aromatic carbonyl compound be obtained during this step in order that complete complexing of the carbonyl compound be obtained. Failure to completely convert the carbonyl compound to a Lewis salt may lead to side-chain reactions and/or reduced yields of the desired ring halogenated aromatic carbonyl compound. Intimate mixing and reaction of the Lewis acid and the aromatic carbonyl compound are improved where the resulting Lewis salt is in the liquid state. While many of the Lewis salts of aromatic carbonyl compounds are in a liquid state at room temperature, or at the increased temperature of the reaction mixture due to the generally exothermic nature of the complexing reaction, it is sometimes necessary or desirable to supply additional heat to the reaction mixture to increase the rate of reaction and to bring the Lewis salt of the carbonyl compound to a liquid state. Where the aromatic carbonyl compound is also a normally solid material, the supply of additional heat to the reaction mixture becomes very desirable. During this complexing step, temperatures usually employed are within the range of about 25–85° C., although higher temperatures up to the order of 185° C. can be employed.

After the formation of the Lewis salt of the aromatic carbonyl compound is completed, and a reaction mixture is provided comprised of that Lewis salt and a quantity of unreacted strong Lewis acid, the halogen molecules are then brought into intimate contact with that reaction mixture. Where the halogen molecules are in liquid form, they can be dropped on the agitated surface of the reaction mixture. On the other hand, intimate contact of the halogen molecules with the reaction mixture, where the halogen molecules are in gaseous form, can better be obtained by introducing the gas under the surface of the reaction mixture. Liquid halogen molecules can likewise be introduced under the surface of the reaction mixture if desired. The number of halogen substituents which can be placed on an aryl radical depends upon the number of positions available for halogen substitution, it being necessary to provide one halogen equivalent for each substitution desired. For example, mono-, di-, tri-, or tetra-halogenation can be effected on a phenyl radical, as represented by Ar in the formula hereinabove set out, by controlling the equivalents of halogen available for substitution.

The introduction of the halogen molecules into the reaction mixture is accompanied by an evolution of a hydrogen halide by-product. It is generally desirable to add the halogen molecules either continuously or in increments so as to obtain a more or less steady rate of evolution of the by-product hydrogen halide. This by-product hydrogen halide escapes from the reaction mixture into the head space of the reactor, from which it should be more or less continuously removed.

After the halogenation reaction is essentially complete, as evidenced by a low rate or stoppage of evolution of hydrohalide, the reaction mixture is then removed from the reactor and quenched in a cold aqueous solution of hydrochloric acid. The purpose of this quenching is to liberate the halogenated aromatic carbonyl compound from its complex with the Lewis acid. The halogenated aromatic carbonyl compound can then be removed from the quench liquor by solvent extraction with a solvent which has preferential solubility for the halogenated aromatic carbonyl compound and, at the same time, is substantially immiscible with the aqueous quench liquor. Diethyl ether performs very well for the purpose of extracting the halogenated aromatic carbonyl compound from the quench liquor. The extract can then be washed successively with acid, dilute alkali, and water, and finally dried and fractionated to recover the halogenated aromatic carbonyl compounds.

The following examples are given to illustrate the preparation of ring halogenated aromatic carbonyl compounds in accordance with the method of this invention, however the specific details of these examples are not to be taken as limitations upon the invention.

Example 1

113 grams (0.84 mol) of anhydrous aluminum chloride was placed in a closed reaction vessel. Acetophenone was added, by increments and with stirring, to the aluminum chloride until a total of 40.4 grams (0.336 mol) of acetophenone had also been charged to the reactor. Stirring was then continued until the formation of the Lewis salt between the acetophenone and the aluminum chloride was complete, which required about eleven minutes. During this complexing reaction, the exothermic nature of the reaction caused the temperature to increase, and the color of the reaction mixture changed from an initial orange color to a final tan colored liquid. After the complexing reaction was complete, stirring of the reaction mixture was continued for about ten minutes, permitting the reaction mixture to cool down to ambient temperatures. It will be noted that, while 113 grams of aluminum chloride was charged to the reactor, only 45.3 grams was actually required to completely form the Lewis salt with the acetophenone. The excess aluminum chloride was therefore available in the reaction mixture to generate the bromine halogenating species upon the addition of molecular bromine in the subsequent halogenation step.

The introduction of liquid molecular bromine into the reaction vessel was then begun, with the bromine being added in small increments and with continuous stirring. Shortly after the initial increment of bromine, the evolution of the by-product hydrogen bromide began. A total of 64.4 grams (0.403 mol) of bromine was added, requiring a total time of about seventeen minutes. Thereafter, stirring of the reaction mixture was continued for about one hour, during which time the evolution of hydrogen bromide ceased and at the end of which time the reaction mixture essentially solidified.

The reaction mixture was then removed from the reactor and quenched in a one-liter beaker containing cracked ice and 100 ml. concentrated hydrochloric acid. This quench mixture was then extracted three times with 200 ml. proportions of diethyl ether and the combined extracts then washed thoroughly with 10% aqueous hydrochloric acid in three 200 ml. portions, then with three 200 ml. portions of 10% aqueous sodium bicarbonate, and finally with three 200 ml. portions of water. This washed extract was then dried over 50 grams of anhydrous sodium sulfate. This dried extract was then placed in the reboiler of a fractionating system from which was recovered 47.0 grams of m-bromoacetophenone, representing a yield of 70.7 mol percent based on the acetophenone charged to the reactor.

Example 2

A Lewis salt of acetophenone was prepared by reacting the chemical equivalents obtainable from 113 grams (0.84 mol) of anhydrous aluminum chloride and 40.4 grams 0.336 mol) of acetophenone in the same manner as described in Example 1. After the Lewis salt complexing of the actophenone with aluminum chloride was completed, the reaction mixture was then heated to and maintained at temperatures within the range of 80–85° C. during the subsequent addition of 64.4 grams (0.403 mol) of bromine to effect the halogenation reaction. After the halogenation reaction was completed, the reaction mixture was then quenched and worked up in the manner as described in Example 1, from which there was recovered 49.1 grams of m-bromoacetophenone, representing a yield of 73.5%, mol percent based on the acetophenone charged to the reactor.

Example 3 m-Bromoacetophenone can also be prepared by first charging about 200 ml. of 66° Bé. sulfuric acid to a closed reactor, to which is added, by increments and with stirring, a total of 40.4 grams (0.336 mol) of acetophenone. The Lewis salt complex readily forms between the acetophenone and the sulfuric acid. To this reaction mixture is then added 45.3 grams (0.336 mol) of aluminum chloride to provide the excess of a strong Lewis acid required to generate the halogenating bromine from molecular bromine, the purpose of this example being to show how a different strong Lewis acid can be employed in the complexing and halogenating steps. Thereafter, incremental addition of a total of 64.4 grams (0.403 mol) of molecular bromine to the reaction mixture results in the evolution of hydrogen bromide evidencing the progression of the halogenation reaction. After addition of the bromine and the evolution of hydrogen bromide are both complete, the total reaction mixture is then quenched in a mixture of ice and hydrochloric acid to break the Lewis salt complex and to remove the aluminum salt and thereby liberate the m-bromoacetophenone, which is recovered in the manner described in Example 1. The yield is lower however, due to the formation of substantial amounts of phenacylbromide, as compared to the yield of Example 1. As a further alternative, an oleum can be used as the sole Lewis acid for both the complexing and halogenating steps, the oleum replacing both the 66° Bé. sulfuric acid and the aluminum chloride. Where an oleum is used as the only Lewis acid, the quenching can be accomplished with ice or cold water only, without the hydrochloric acid.

Example 4

Following the procedure of Example 1, 56.5 grams (0.42 mol) of anhydrous aluminum chloride and 39.8 grams (0.20 mol) of p-bromoacetophenone (4-bromoacetophenone) were charged to a reactor with the formation of the Lewis salt between the aluminum chloride and the p-bromoacetophenone. While p-bromoacetophenone is a solid at room temperature, the reaction mixture for the formation of the Lewis salt became liquid after about one-third of the ketone had been added, without supplying any heat to the reactor other than that generated due to the exothermic nature of the reaction. Halogenation was then effected by the incremental addition of 32.0 grams (0.20 mol) of molecular bromine. After quenching the final reaction mixture and recovering the product in the manner described in Example 1, there was obtained a 50% yield of 3,4-dibromoacetophenone, mol percent based on the 4-bromoacetophenone charged.

Example 5

Following the procedure of Example 2, 113 grams (0.84 mol) of anhydrous aluminum chloride and 32.5 grams (0.27 mol) of acetophenone were charged to a reactor with the formation of the Lewis salt between the aluminum chloride and the acetophenone. Halogenation was then effected by the incremental addition of 90.9 grams (0.57 mol) of bromine, i.e., mol ratio of acetophenone to bromine being 1.0:2.1. The predominant recovered product was 2,5-dibromoacetophenone.

Example 6

Following the procedure of Example 1, 113 grams of anhydrous aluminum chloride, 56.6 grams of p-methylacetophenone, and 67.1 grams of bromine were employed to obtain a yield of 56.2% 3-bromo-4-methylacetophenone, mol percent based on the p-methylacetophenone charged.

Example 7

Following the procedure of Example 1, 113 grams of anhydrous aluminum chloride, 37.5 grams of p-methylacetophenone, and 102.3 grams of bromine were employed to obtain a yield of 57.3 mol percent of 3,5-dibromo-4-methylacetophenone, 104° C. M.P. based on the p-methylacetophenone charged.

Example 8

Following the procedure of Example 1, 113 grams of aluminum chloride, 49.6 grams of propiophenone, and 59.2 grams of bromine were employed to obtain a yield of 60% of m-bromopropiophenone, mol percent based on the propiophenone charged.

Example 9

Following the procedure of Example 1, 113 grams of aluminum chloride, 123.3 grams of p-tert.-butylacetophenone, and 111.9 grams of bromine were employed to obtain a yield of 45.6 mol percent of m-bromo-p-tert.-butylacetophenone, B.P. 113°/1 mm. Hg, oxime M.P. 90° C., based on the p-tert.-butylacetophenone charged.

Example 10

Following the procedure of Example 1, 113 grams of aluminum chloride, 35.7 grams of benzaldehyde, and 59.1 grams of bromine were employed to obtain a yield of 52.5% of m-bromobenzaldehyde, mol percent based on the benzaldehyde charged.

Example 11

Following the procedure of Example 1, 113 grams of aluminum chloride, 40.3 grams of p-tolualdehyde, and 59.1 grams of bromine were employed to obtain a yield of 42 mol percent of 3-bromo-4-methylbenzaldehyde, M.P. 49° C., based on the p-tolualdehyde charged.

Example 12

A Lewis salt of acetophenone was prepared by reacting the chemical equivalents obtainable from 113.5 grams (0.84 mol) of anhydrous aluminum chloride and 50.4 grams (0.42 mol) of acetophenone in the same manner as described in Example 1. The resulting reaction mixture, comprised of about 0.42 mol of the aluminum chloride-acetophenone Lewis salt and about 0.42 mol of unreacted anhydrous aluminum chloride within the closed reactor, was then maintained at a temperature of about 40° C. over a 4½ hour period, during which time 27.8 gram (0.56 mol) of molecular chlorine was passed into the reaction mixture by introducing gaseous chlorine under the surface of the agitated reaction mixture. Hydrogen chloride was evolved as a by-product. Agitation of the halogenation reaction mixture was continued for about 45 minutes after the introduction of chlorine was stopped, during which time the reaction mixture cooled down to ambient temperatures. This resulting reaction mixture was then removed from the reaction and quenched by pouring over crushed ice and hydrochloric acid. After the quenched mixture had warmed up to ambient temperature, it was extracted with diethyl ether, the extract being then successively washed with 5% hydrogen chloride, three times with water, two times with a 20% aqueous sodium bicarbonate solution, and finally three times with water. Dehydration, ether stripping, and fractionation of the extract produced 38.8 grams of m-chloroacetophenone, representing a yield of 66 mol percent based on acetophenone charged consumed by the process reactions.

Example 13

A Lewis salt of acetophenone was prepared by reacting the chemical equivalents obtainable from 0.82 mol of anhydrous aluminum chloride and 0.33 mol of acetophenone following the procedure of Example 1. The resulting reaction mixture, comprised of about 0.33 mol of the aluminum chloride-acetophenone Lewis salt and about 0.49 mol of unreacted anhydrous aluminum chloride, was then reacted, within the closed reactor, with 0.4 mol of iodine monochloride and without the application of any external heat. The reaction mixture from this halogenation step was then quenched and worked up following the procedure of Example 12. Two principal products were recovered, m-chloroacetophenone in a yield of 65.2% and m-iodoacetophenone in a yield of 20.8%, both yields based on acetophenone consumed by the process reactions.

Example 14

A Lewis salt of 4-methylacetophenone was prepared by reacting the chemical equivalents obtainable from 0.85 mol of anhydrous aluminum chloride and 0.46 mol of 4-methylacetophenone in the same manner as described in Example 1. The resulting reaction mixture, comprised of about 0.46 mol of aluminum chloride-4-methylacetophenone Lewis salt and about 0.39 mol of unreacted aluminum chloride within the closed reactor, was then maintained at temperatures within the range of 78–83° C. by supplying external heat to the reactor, while 0.55 mol of iodine monochloride was incrementally brought into intimate contact with the reaction mixture to effect the halogenation reaction. The reaction mixture from this halogenation step was cooled to ambient temperature, then quenched and worked up following the procedure of Example 12. Two principal products were recovered, 3-chloro-4-methylacetophenone in a yield of 25% and 3-iodo-4-methylacetophenone in a yield of 36%, both yields based on the 4-methylacetophenone originally charged to the reactor.

Example 15

A Lewis salt of benzophenone can be prepared by reacting the chemical equivalents obtainable from 0.92 mol of anhydrous aluminum chloride and 0.45 mol of benzophenone in the manner as described in Example 1. Although benzophenone is a solid at room temperature, the complexing with aluminum chloride can be effected without the use of external heat. The temperature of the resulting reaction mixture, comprised of about 0.45 mol of the aluminum chloride-benzophenone Lewis salt and about 0.47 mol of unreacted aluminum chloride, is then raised to about 85° C. and reacted with bromine, 0.98 mol being supplied into the reaction mixture. After the evolution of the hydrogen bromide had substantially ceased, the reaction mixture was stirred while being permitted to cool to room temperature. Thereafter, the reaction mixture from the halogenation step was quenched and worked up following the procedure described in Example 1, providing 3,3'-dibromobenzophenone in a yield of 30% based on benzophenone consumed by the reaction.

Example 16

Benzil having the formula,

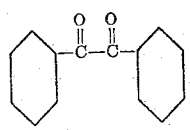

is complexed to a Lewis salt by reacting the chemical equivalents obtainable from 104.5 grams (0.499 mol) of benzil and 266.7 grams (2.0 mols) of anhydrous aluminum chloride following the procedure described in Example 1, except that the reaction mixture is maintained at temperatures within the range of about 85–100° C. during this complexing step. After the formation of the Lewis salt is complete, providing a reaction mixture comprised of about ½ mol of aluminum chloride-benzil Lewis salt and about ½ mol of unreacted aluminum chloride, the temperature of the reaction mixture is continued while 165 grams of bromine are incrementally supplied to the reactor and brought into intimate contact with the reaction mixture. After the evolution of hydrogen bromide ceases, the reaction mixture is cooled, quenched, and worked up in the manner described for Example 1, except that the fractionation is carried out under reduced pressure of about 2 mm Hg. 3,3'-Dibromobenzyl is recovered.

The products 3,5-dibromo-4-methylacetophenone (Example 7), m-bromo-p-tert.-butylacetophenone (Example 9), and 3-bromo-4-methylbenzaldehyde (Example 11) are new compounds, having not been described heretofore in the prior art. These compounds are useful as contact herbicides and as fungicides and fungistats.

What is claimed is:

1. The method comprising reacting (1) a Lewis salt of a strong Lewis acid and an aromatic carbonyl compound having the formula,

wherein Ar is an aryl radical free from nitrogen-containing substituents and R is selected from the group consisting of (a) hydrogen and (b) aliphatic and heterocyclic radicals free from nitrogen-containing substituents, with (2) a halogen in the presence of a strong Lewis acid.

2. The method of claim 1 in which a strong Lewis acid is anhydrous aluminum chloride.

3. The method comprising reacting (1) a Lewis salt of a strong Lewis acid and an aromatic ketone having the formula,

wherein Ar is an aryl radical free from nitrogen-containing substituents and R is an alkyl radical, with (2) a halogen in the presence of a strong Lewis acid.

4. The method of claim 3 in which a strong Lewis acid is anhydrous aluminum chloride.

5. The method comprising reacting (1) a Lewis salt of a strong Lewis acid and an aromatic aldehyde having the formula,

wherein Ar is an aryl radical free from nitrogen-containing substituents, with (2) a halogen in the presence of a strong Lewis acid.

6. The method of claim 5 in which a strong Lewis acid is anhydrous aluminum chloride.

7. The method comprising reacting (1) a Lewis salt of a strong Lewis acid and an aromatic ketone having the formula,

wherein Ar is the phenyl group and R is an alkyl group, with (2) a halogen in the presence of a strong Lewis acid.

8. The method of claim 7 in which a strong Lewis acid is anhydrous aluminum chloride.

9. The method comprising reacting (1) a Lewis salt of a strong Lewis acid and an aromatic ketone having the formula,

wherein Ar is an alkyl-substituted phenyl group and R is an alkyl group, with (2) a halogen in the presence of a strong Lewis acid.

10. The method of claim 9 in which a strong Lewis acid is anhydrous aluminum chloride.

11. The method comprising reacting a Lewis salt of a strong Lewis acid and benzaldehyde with a halogen in the presence of a strong Lewis acid.

12. The method of claim 11 in which a strong Lewis acid is anhydrous aluminum chloride.

13. The method comprising reacting (1) a Lewis salt of a strong Lewis acid and a benzaldehyde having at least one alkyl nuclear substituent, with (2) a halogen in the presence of a strong Lewis acid.

14. The method of claim 13 in which a strong Lewis acid is anhydrous aluminum chloride.

15. The method comprising reacting a mixture of anhydrous aluminum chloride and a Lewis salt of aluminum chloride and acetophenone with molecular chlorine.

16. The method comprising reacting a mixture of anhydrous aluminum chloride and a Lewis salt of aluminum chloride and acetophenone with molecular bromine.

17. The method comprising reacting a mixture of anhydrous aluminum chloride and a Lewis salt of aluminum chloride and acetophenone with iodine monochloride.

18. The method comprising reacting a mixture of anhydrous aluminum chloride and a Lewis salt of aluminum chloride and an acetophenone having at least one alkyl nuclear substituent with molecular chlorine.

19. The method comprising reacting a mixture of anhydrous aluminum chloride and a Lewis salt of aluminum chloride and an acetophenone having at least one alkyl nuclear substituent with molecular bromine.

20. The method comprising reacting a mixture of anhydrous aluminum chloride and a Lewis salt of aluminum chloride and an acetophenone having at least one alkyl nuclear substituent with iodine monochloride.

21. The method comprising reacting a mixture of anhydrous aluminum chloride and a Lewis salt of anhydrous aluminum chloride and benzaldehyde with molecular chlorine.

22. The method comprising reacting a mixture of anhydrous aluminum chloride and a Lewis salt of anhydrous aluminum chloride and benzaldehyde with molecular bromine.

23. The method comprising reacting a mixture of anhydrous aluminum chloride and a Lewis salt of anhydrous aluminum chloride and a benzaldehyde having at least one alkyl nuclear substituent with molecular chlorine.

24. The method comprising reacting a mixture of anhydrous aluminum chloride and a Lewis salt of anhydrous aluminum chloride and a benzaldehyde having at least one alkyl nuclear substituent with molecular bromine.

References Cited in the file of this patent

UNITED STATES PATENTS 2,773,758    Schlesinger _____ Dec. 11, 1956

OTHER REFERENCES

Thomas: Anhyd. "Aluminum Chloride in Org. Chem.," pages 610–615 (1941).

Lutz et al.: Chem. Abstracts, vol. 42, page 1227g (1948).

Burckhalter et al.: J. Am. Chem. Soc., vol. 76, page 4114 (1954).